US005644519A

United States Patent [19]
Yatim et al.

[11] Patent Number: 5,644,519
[45] Date of Patent: Jul. 1, 1997

[54] METHOD AND APPARATUS FOR A MULTIPLY AND ACCUMULATE CIRCUIT HAVING A DYNAMIC SATURATION RANGE

[75] Inventors: David Yatim; James W. Girardeau, Jr., both of Austin, Tex.

[73] Assignee: Motorola, Inc., Schaumburg, Ill.

[21] Appl. No.: 418,355

[22] Filed: Apr. 7, 1995

[51] Int. Cl.$^6$ ................................................. G06F 7/38
[52] U.S. Cl. ........................................................ 364/736.02
[58] Field of Search ................................. 364/736, 715.06

[56]  References Cited

U.S. PATENT DOCUMENTS

| 5,208,770 | 5/1993 | Ito ............................................. 364/736 |
| 5,402,368 | 3/1995 | Yamada et al. ........................... 364/736 |

OTHER PUBLICATIONS

DSP56100 Digital Signal Processor Family Manual; Section 2: CPU Architecture Overview, pp. 2-1 through 2-7; Section 3: Data ALU, pp. 3-1 through 3-19.

Primary Examiner—Tan V. Mai

[57]  ABSTRACT

A method and apparatus for a multiply accumulate circuit (10) having a programmable saturation value is accomplished by providing saturation logic (20) that receives a saturation range signal (32) from a Digital Signal Processor (DSP) programmer. The saturation range signal (32) is then converted to a selected saturation value (34) and provided as an input to the saturation logic (20). The saturation logic (20) utilizes the selected saturation value (34) to establish an intermediate saturation value (30). For each intermediate resultant generated by the multiply and accumulate circuit (10), the intermediate resultant is compared with the intermediate saturation value (30). When the intermediate resultant compares unfavorably to the intermediate saturation value (30), a saturation default value (42) is supplied to the accumulator register. Additionally, the final accumulate result is compared against a final saturation value, and, if unfavorable, a saturation value is provided as the final result.

16 Claims, 4 Drawing Sheets

METHOD AND APPARATUS FOR A MULTIPLY AND ACCUMULATE CIRCUIT HAVING A DYNAMIC SATURATION RANGE

TECHNICAL FIELD OF THE INVENTION

This invention relates generally to digital signal processors and more particularly to multiply and accumulate circuits contained within such digital signal processors.

BACKGROUND OF THE INVENTION

Digital signal processors (DSP) are well known to include program memory, data memory, an address generation unit, a peripheral device interface, internal data buses, a program unit, and a data arithmetic logic unit (ALU). The data ALU generally further comprises an input register, an output register, and a multiply accumulate unit (MAC).

DSPs provide high speed execution of numerically intensive applications such as digital filtering applications. As is known, digital filtering applications typically include a plurality of multiply and accumulate steps to achieve the desired digital filter. The MAC may execute a significant number of the multiply and accumulate steps in order to complete a single filtering function.

The data ALU further includes an accumulator register which receives intermediate resultants from the MAC and provides the intermediate resultants back to the MAC for the additional multiply and accumulation steps. Due to hardware constraints, the accumulator register has a fixed bit size. For example, in a Motorola DSP 56100, the accumulator register is 40 bits wide. Other DSPs, however, may have accumulator registers with widths up to 96 bits of capacity.

In the DSP, the data buses also have a fixed bit size which typically does not match the bit capacity of the accumulator. For example, the bit size of a data bus may be 16 bits, 24 bits, or 32 bits. As mentioned, the bit capacity of the accumulator register is 24 bits up to 96 bits. Therefore, the accumulator register is segregated into various portions, one portion of which is provided as an output to the data buses after the completion of an operation while another portion serves as an overflow portion, the respective portions often referred to as the fractional and integer portions. The segregation of these portions and the relationship of the segregation of the portions to one another allows intermediate calculations to exceed in value the size of a valid final result in the fractional portion. However, this relationship is fixed by the hardware.

Due to the size limitations of the accumulator register, some digital filter application calculation results will exceed the total bit capacity of the accumulator register. Once the bit capacity of the accumulator register has been exceeded, an error condition arises and a default value is entered in memory for the particular series of calculations. An overflow of this nature is generally known as a saturation of an operation or of a result. Further, a final calculation may result in a result that exceeds the data bus width. In this situation, a saturation also occurs and another default value is entered into memory instead of the result.

The sizes of the fractional portion, integer portion, and other portions of the accumulator are determined by the hardware used and thus are not programmable by the user of the DSP. Thus, the programmer must develop instructions that perform within the limits defined by the DSP architecture without unduly limiting the performance of the DSP.

A common technique that prevents the accumulator register from saturating is scaling down the input values to the MAC. By scaling down the inputs to the MAC, the resultant is guaranteed not to exceed the maximum bit capacity of the accumulator register. While scaling down prevents accumulator saturation, the precision of the inputs and the resultant is lost due to shifting of data required to scale the inputs. For digital signal processing applications, when precision is reduced, the signal to noise ratio is also reduced. Thus, in such DSP applications requiring a maximum signal to noise ratio, or margin, the lost precision due to scaling is unacceptable.

Therefore, a need exists for a method and apparatus that allows for a saturation value to be programmed by a DSP programmer.

DETAILED DESCRIPTION OF THE DRAWINGS

Generally, the present invention provides a method and apparatus for a multiply accumulate circuit having a programmable saturation value. This is accomplished by providing saturation logic that receives a saturation range signal from a DSP programmer. The saturation range signal is then converted to a selected saturation value and provided as an input to the saturation logic. The saturation logic utilizes the selected saturation value to establish an intermediate saturation value. For each intermediate resultant generated by the multiply and accumulate circuit, the intermediate resultant is compared with the intermediate saturation value. When the intermediate resultant compares unfavorably to the intermediate saturation value, a saturation default value is supplied to the accumulator register, and the process is complete for this multiply accumulate iteration. If the intermediate saturation value is not exceeded and a final resultant for this particular MAC operation is produced, the final resultant is compared against a final saturation value. If the comparison is unfavorable, a default, or saturation, value is provided in place of the final resultant. With such a method and apparatus, a DSP programmer can select the intermediate saturation value to accommodate the particular multiply accumulate functions being performed. With this type of selectability, the DSP programmer can avoid scaling the inputs to the multiplier accumulate circuit, thereby avoiding the lost precision that scaling introduces.

Figure 1:
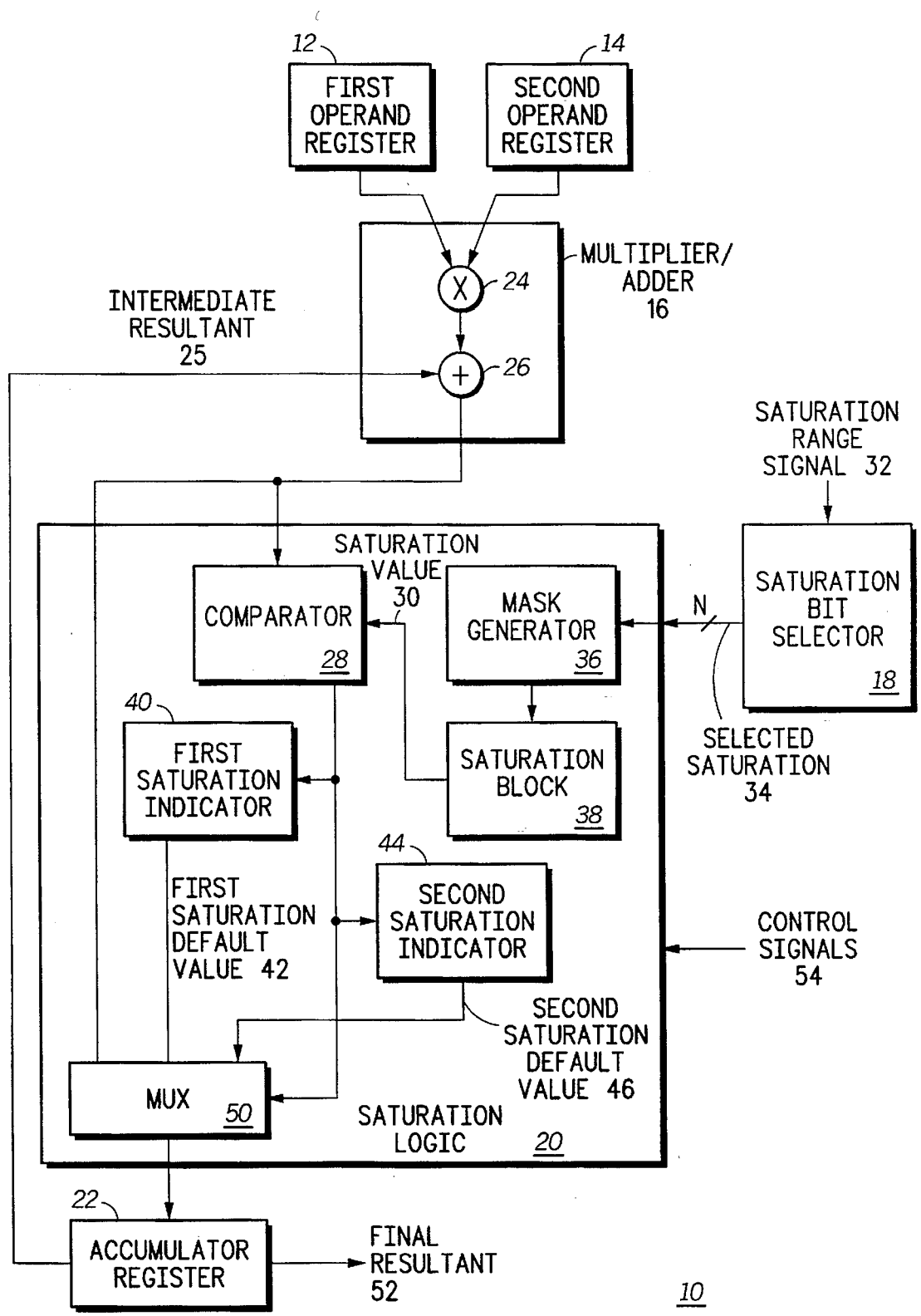
FIG. 1 illustrates a schematic block diagram of a multiply accumulate circuit in accordance with the present invention.

FIG. 1 illustrates a multiply and accumulate circuit 10, which includes a first operand register 12, a second operand register 14, a multiplier/adder circuit (MAC) 16, a saturation bit selector 18, a saturation logic circuit 20, and an accumulator register 22. The multiply accumulate circuit 10 is incorporated into the data arithmetic logic unit (ALU) of a digital signal processor. The overall operation of a digital signal processor (DSP) is not readily germane to the present application. Thus, the overall operation of a DSP will only be described to further illustrate the operations of the present invention.

In operation, the first operand register 12 and the second operand register 14 receive data signals from one of the DSP data buses. This is done under the control of the DSP core (not shown). The signals stored in the first and second operand registers 12 and 14 are provided to a multiplier 24 of the multiplier and adder circuit 16. A resultant from the multiplier 24 is summed together with an intermediate resultant 25 by adder 26. The resultant produced by the adder 26 is routed to the saturation logic circuit 20. In general, if the intermediate resultant produced by the adder 26 does not exceed a saturation value, it is passed to the accumulator register 22 for temporary storage. The intermediate resultant 25 stored in the accumulator is either routed as the final resultant 52 or as an intermediate resultant 25 back to the adder 26.

The selection for muting the contents of the accumulator register 22 is determined by the particular application being performed by the DSP. For example, for a digital filtering application, the accumulator register 22 will repeatedly provide its contents back to the multiplier adder 16 as an intermediate resultant 25. When the DSP core has determined that the complete digital filter application has been performed, the accumulator register 22 then provides its contents as the final resultant 52.

In operation, a DSP programmer provides a saturation range signal 32 to the saturation bit selector 18. The saturation bit selector 18 and the saturation logic circuit 20 then generate a saturation value 30, based on the saturation range signal 32, for comparison with a resultant produced by the adder 26. The saturation range signal 32 is typically a digital signal representing the particular saturation range that the DSP programmer requires. For example, in certain digital filtering applications, the intermediate resultants may be several magnitudes larger than the final resultants. Therefore, the saturation range will need to indicate a large intermediate saturation value 30. In contrast, when the digital filtering application has the intermediate resultants relatively close to the final resultant, the saturation range signal will have a much smaller intermediate saturation value. This will be more fully described with reference to FIG. 3 and FIG. 4 below.

The saturation logic circuit 20 includes a comparator 28, a mask generator 36, a saturation block 38, a first saturation indicator 40, a second saturation indicator 44, and a multiplexer 50. The saturation logic 20, via the mask generator 36, receives a selected saturation value 34 from the saturation bit selector 18. The saturation bit selector 18 generates the selected saturation value 34 from the saturation range signal 32. In general, the selected saturation value 34 will be a binary value of a fixed bit length, wherein one of the bits will have an opposite value to the remaining bits. This opposite bit value will indicate where the saturation point is to occur. For example, for a 10 bit word, a selected saturation value may be 0010000000, where the third most significant bit indicates the saturation point.

The mask generator 36 receives the selected saturation value 34 and converts it into a mask saturation value. The mask saturation value converts the selected saturation value into two sections based on the saturation point. For example, using the 10 bit word example previously discussed, the mask saturation value would be 1110000000. The mask saturation value is routed to the saturation block 38, which produces the saturation value 30.

The saturation value 30 is provided to the comparator 28, wherein the comparator uses the saturation value as a threshold to compare to the resultant from the adder 26.

When the resultant from the adder 26 is less than the saturation value, the comparator 28 provides a control signal to multiplexer 50, which allows the resultant to pass to the accumulator register 22. If, however, the comparator 28 determines that the resultant from the adder 26 is greater than the saturation value, the comparator enables either the first saturation indicator 40 or the second saturation indicator 44.

The first saturation indicator 40 will be enabled by a control signal 54, which is produced by the DSP core, when the multiply accumulate circuit is performing an intermediate function of a desired multiply accumulate function. Thus, when the first saturation indicator 40 is enabled, it will provide a first saturation default value 42 to the multiplexer 50, which is subsequently routed to the accumulate register 22. The first saturation default value 42 may be selected by the DSP programmer and is typically representative of either a maximum rail or minimum rail value.

The second saturation indicator 44 will be enabled by the control signal 54 when the saturation value 30 is a final saturation value. When this occurs, the second saturation indicator 44 provides a second, or final, saturation default value 46 to the multiplexer 50, which is subsequently routed to the accumulator register 22. As with the first saturation default value 42, the second saturation default value 46 may be selected by the DSP programmer to be any numerical value desired.

Once the multiply accumulate circuit 10 has performed the desired multiply accumulate function, the DSP core controls the accumulator register 22 to output a final resultant 52. The final resultant is then utilized by the DSP core, as determined by the overall function being executed.

Figure 2:
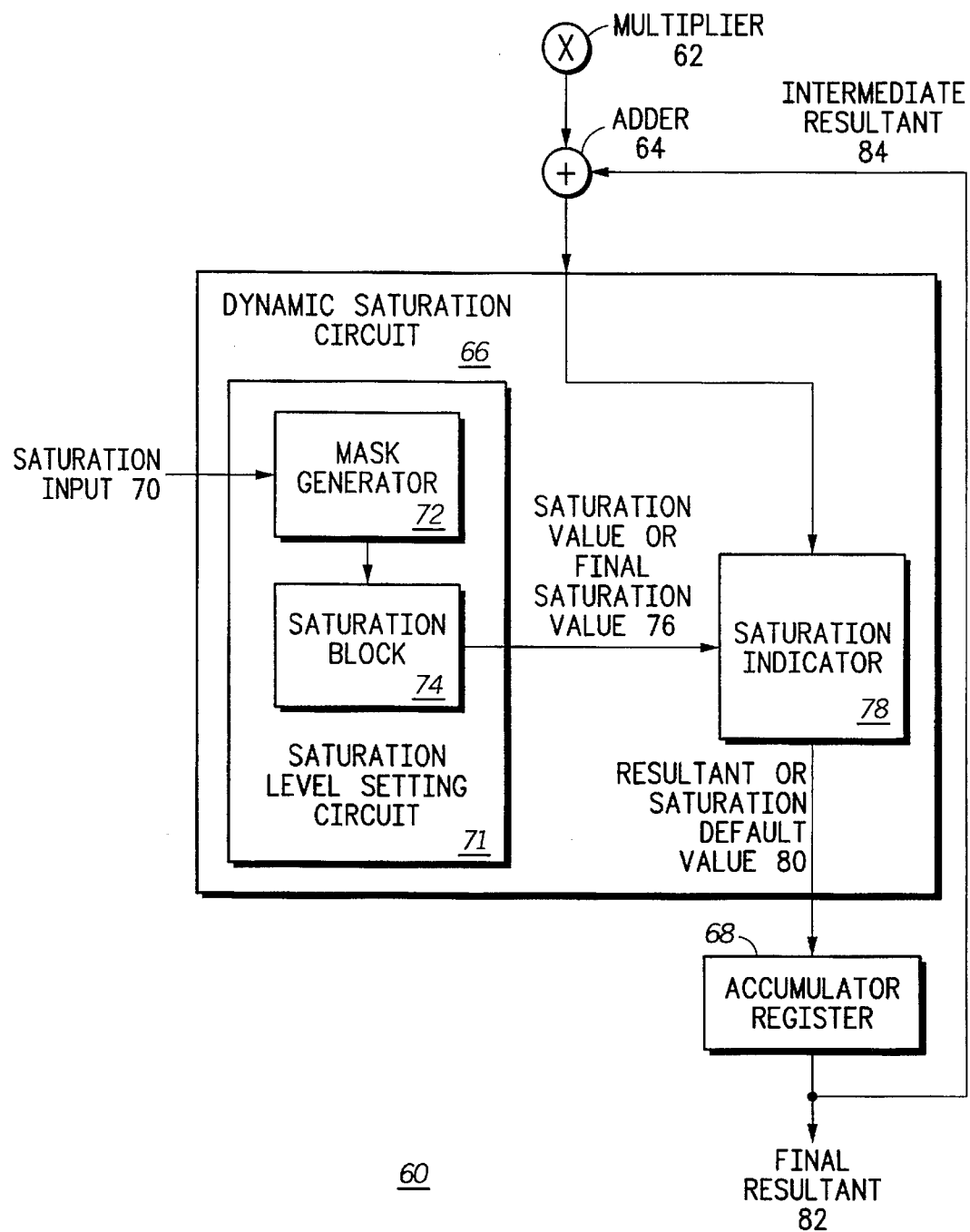
FIG. 2 illustrates an alternative multiply accumulate circuit for use within a digital signal processor in accordance with the present invention.

FIG. 2 illustrates an alternative multiply accumulate circuit 60 which includes a multiplier 62, an adder 64, a dynamic saturation circuit 66, and an accumulator register 68. The multiply accumulate circuit 60 receives input signals at the multiplier 62, which multiplies the signals to produce a result. This result is added to an intermediate result 84 by the adder 64. The resultant of the adder 64 is routed to the dynamic saturation circuit 66 which, when the intermediate result is less than a saturation value, is routed to the accumulator register 68. This process continues until a final resultant 82 is produced or a saturation condition occurs.

The dynamic saturation circuit 66 includes a saturation level setting circuit 71 and a saturation indicator 78. The saturation level setting circuit 71 receives a saturation input, or selected saturation, 70 via a mask generator 72 and produces a representative thereof, a saturation value, or final saturation value 76 via a saturation block 74. In general, a DSP programmer provides the saturation input 70, the mask generator converts the saturation input 70 into a mask saturation signal, and the saturation block 74 produces the saturation value 76.

The saturation indicator 78 compares the intermediate resultant received from the adder 64 with the saturation value or final saturation value 76. The DSP core determines which saturation value the saturation indicator 78 utilizes based upon the iterative multiply accumulate process being performed. Most often, the saturation value will be used as the comparison value. When the intermediate result exceeds the saturation value, the saturation indicator provides a saturation default value 80 to the accumulator register 68. When this occurs, the process is complete for this iterative multiply accumulate function.

Figure 3:
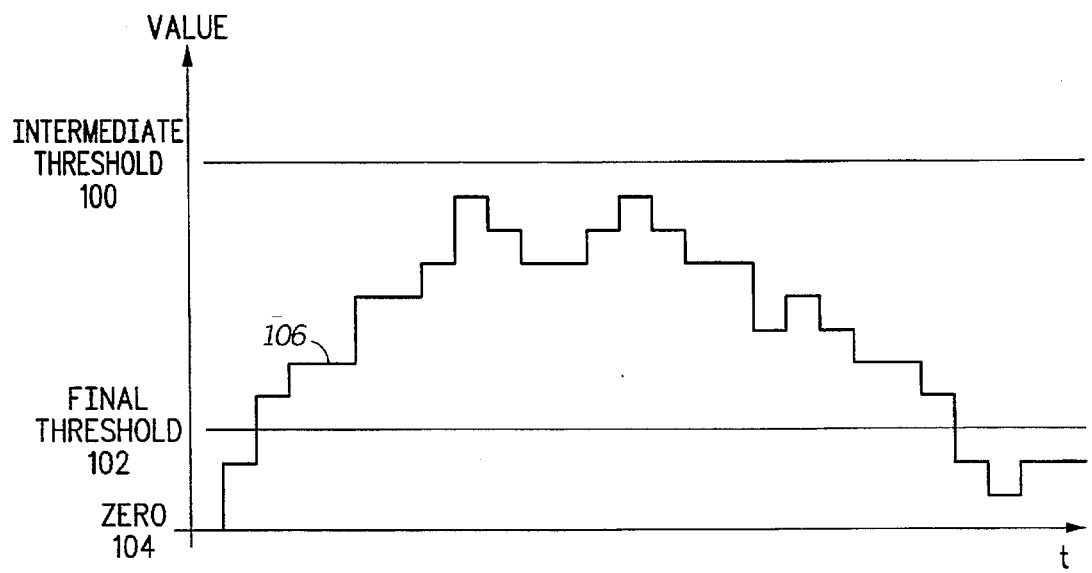
FIG. 3 illustrates a representative multiply accumulate function over time in accordance with the present invention.

FIG. 3 illustrates an example of an iterative multiply accumulate function 016, a corresponding intermediate threshold 100 and a final threshold 102 levels. The axises for the circuit are value, or resultant, versus time. Thus, at time $t_0$, the value is 0. The value incrementally increases for each multiply accumulate function over a first portion of time. As the iterative multiply accumulate function is performed, the intermediate resultant of the function 106 varies its magnitude value from cycle to cycle. As the iterative multiply accumulate process is almost complete, the intermediate result approaches and finally falls within the final threshold 102. As shown, the intermediate threshold, or intermediate saturation value 100, and the final threshold, or final saturation value 102, are separated by a predetermined value. This predetermined value, or separation, is determined by the DSP programmer based upon the type of multiply accumulate function being executed. For example, when the DSP programmer knows that the intermediate results may accumulate to a relatively large value before settling to the final value, the DSP programmer will want to set the intermediate threshold to a relatively large value, such that these intermediate resultants will not be clipped, or saturate the accumulate register.

Figure 4:
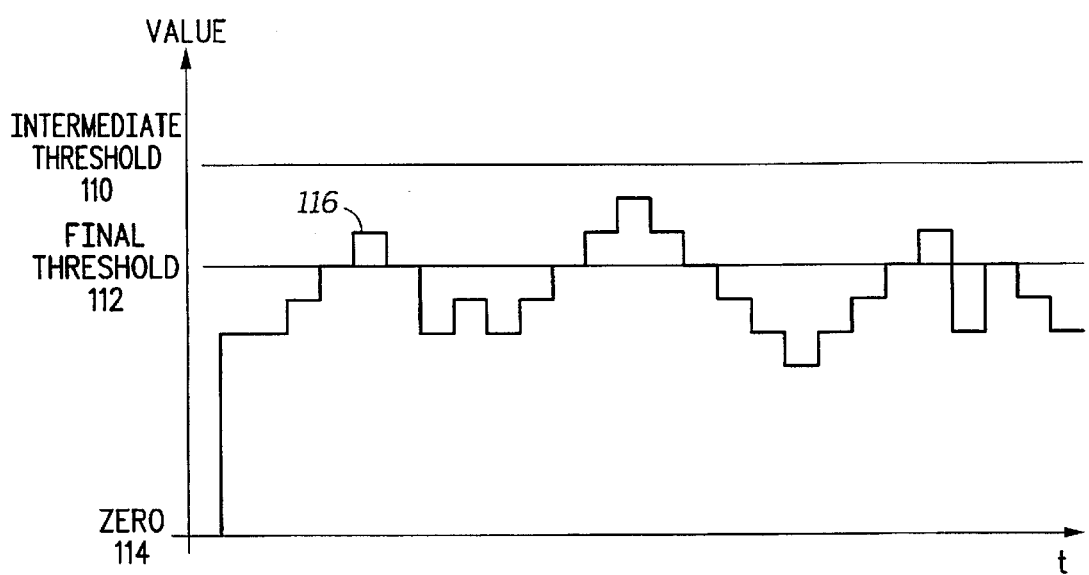
FIG. 4 illustrates an alternative multiply accumulate representative function over time in accordance with the present invention.

FIG. 4 illustrates an alternate diagram of a multiply accumulator function. As with the diagram of FIG. 3, the axises are an intermediate value and time. From this example, the intermediate result 116 is relatively constant around the final threshold 112. Therefore, the intermediate threshold 110 has been selected to be a relatively small value in comparison with the intermediate threshold 100 of FIG. 3. The intermediate threshold 110 is selected by the DSP programmer, who knows the range of the intermediate resultants during the iterative multiply accumulate process. While both FIG. 3 and FIG. 4 illustrate different settings for the intermediate thresholds, the multiply accumulate circuit of FIG. 1 or FIG. 2 allows for the intermediate threshold to be varied as shown, but without loss of precision in the multiply accumulate functiondue to the fact that the DSP programmer does not have to scale the inputs when it is known that intermediate results may accumulate to a relatively large value. Under these circumstances, the DSP programmer may program the intermediate threshold to allow relatively large intermediate resultants.

In addition to programming the saturation value, the DSP programmer may also program which bits of the accumulator register will be provided to the data bus. For example, if the DSP programmer indicates that the first 8 bits are for saturation, the next 24 bits, for a 24 bit bus, may be provided to the data bus. Alternatively, the DSP programmer may select the saturation value to include the first 8 bits, but the value provided to the data bus may start at the sixth bit. As one skilled in the art will readily appreciate, the combination of saturation values and which portions of the accumulator register will be provided to the data bus are numerous.

Figure 5:
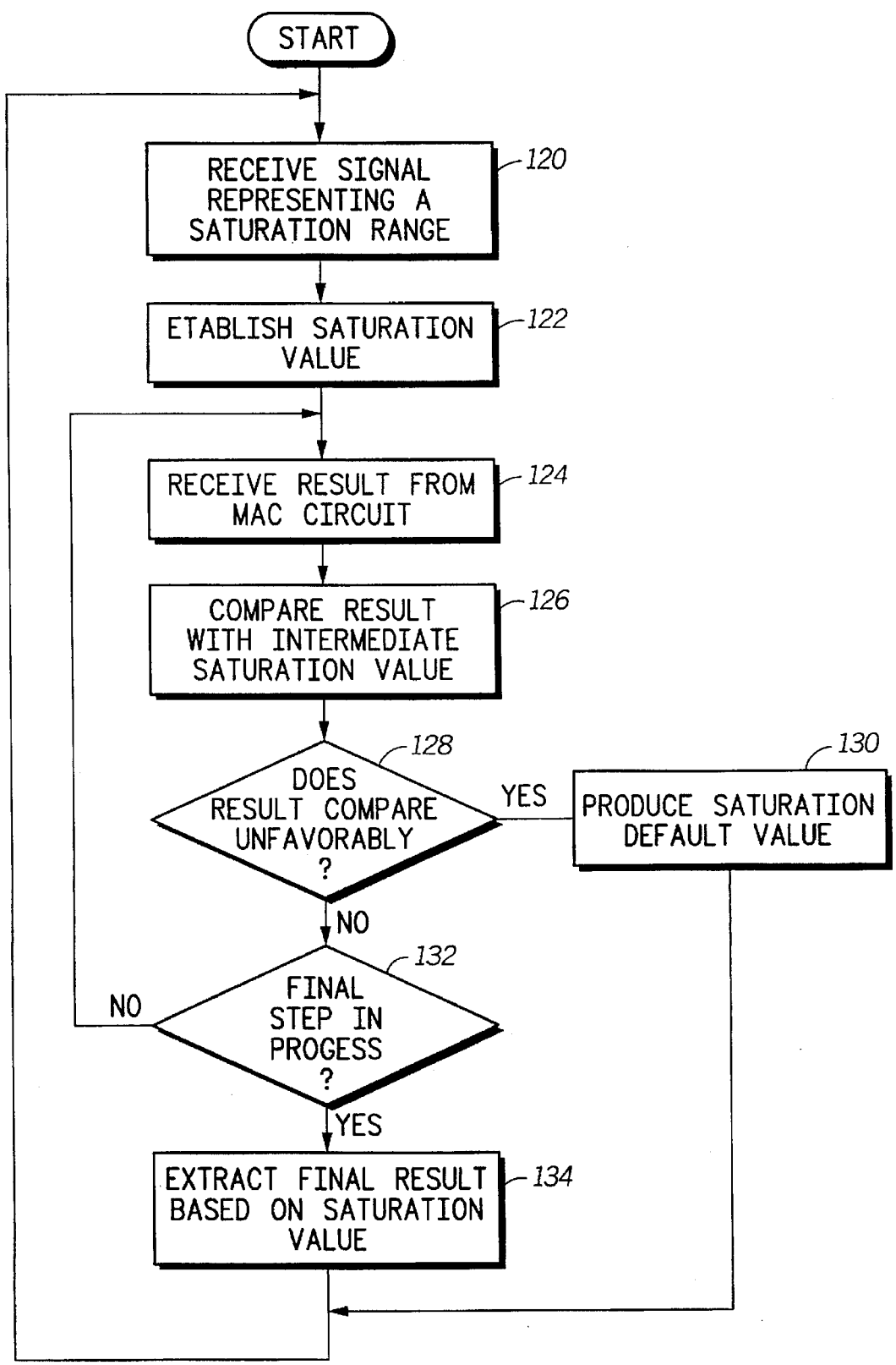
FIG. 5 illustrates a logic diagram that may be used to perform a multiply accumulate function having a selectable saturation value in accordance with the present invention.

FIG. 5 illustrates a logic diagram that may be used to implement a multiply accumulate circuit in accordance with the present invention. At step 120, a signal representing a saturation value is received. From this signal, a saturation value is established at step 122. Having established the saturation value, the process proceeds to step 124, wherein a resultant is received from a multiply accumulate circuit.

At step 126, the resultant from the MAC is compared with the intermediate saturation value. When the comparison is unfavorable, as determined at step 128, the process proceeds to step 132. Note that a comparison may be unfavorable when the saturation value exceeds by the result of the multiply accumulate circuit, or conversely, when the resultant from the multiply accumulate circuit exceeds the saturation. To one skilled in the art, either comparison technique may be used to obtain the desired results.

When the result from the multiplier accumulate circuit compares unfavorably to the saturation value, the process proceeds to step 130, where a saturation default value is provided to the accumulator register. Having done this, the process is complete for this iterative multiply accumulate function. If, however, the result does not compare unfavorably to the saturation value, the process proceeds to step 132. At step 132, a determination is made as to whether this is the final step in the iterative multiply accumulate function. If not, the process proceeds back to step 124. If, however, this is the final step in the iterative multiply accumulate process, the process proceeds to step 134. At step 134, a final resultant is extracted from the accumulator register based on the saturation value. Thus, if the final resultant in the accumulator exceeds a final saturation value, a default final resultant will be obtained, otherwise, the contents of the accumulator register will be used as the final resultant. Having performed these steps, the multiply accumulate circuit is ready for a subsequent instruction to perform another iterative multiply accumulate function.

The present invention provides a method and apparatus for programming a saturation value within a multiply accumulate circuit of a digital signal processor. As such, the prior art limitations, as mentioned, that require the inputs be scaled prior to the multiply accumulate function are eliminated. Also eliminated are the drawbacks which result from scaling the inputs, wherein the drawbacks are reduced precision and reduced signal to noise margins.

The above described preferred embodiments are intended to illustrate the principles of the invention, but not to limit the scope of the invention. Various other embodiments and modifications to these preferred embodiments may be made by those skilled in the art without departing from the scope of the following claims.

We claim:

1. A multiply and accumulate circuit for use in a digital signal processor, wherein the multiply and accumulate circuit comprises:

first operand register;

second operand register;

multiplier/adder operably coupled to the first operand register and the second operand register;

accumulator register;

saturation bit selector that receives a signal representative of a saturation range to produce a selected saturation; and saturation logic operably coupled to the saturation bit selector, the multiplier/adder, and the accumulator register, wherein the saturation logic determines when a resultant of the multiplier/adder compares unfavorably to a representation of the selected saturation.

2. The multiply and accumulate circuit of claim 1 wherein the saturation logic includes a mask generator interoperably coupled to a saturation block to generate a saturation value when an intermediate calculation is being performed and a final saturation value when a final calculation is being performed as the representation of the selected saturation.

3. The multiply and accumulate circuit of claim 2 further comprising a first saturation indicator that provides a first saturation default value to the accumulator register when an intermediate resultant of the multiplier/adder compares unfavorably to the saturation value.

4. The multiply and accumulate circuit of claim 3 further comprising a second saturation indicator that provides a second saturation default value to the accumulator register when a final resultant of the multiplier/adder compares unfavorably to the final saturation value.

5. The multiply and accumulate circuit of claim 4, wherein the second saturation default value is user selectable.

6. The multiply and accumulate circuit of claim 3, wherein the first saturation default value is user selectable.

7. The multiply and accumulate circuit of claim 1 wherein the resultant of the multiplier/adder compares unfavorably to the representation of the selected saturation when the resultant of the multiplier/adder exceeds the representation of the selected saturation.

8. The multiply and accumulate circuit of claim 1 wherein the resultant of the multiplier/adder compares unfavorably to the representation of the selected saturation when the representation of the selected saturation exceeds the resultant of the multiplier/adder.

9. A multiply and accumulate circuit for use in a digital signal processor, wherein the multiply and accumulate circuit comprises:

multiplier;

adder;

a dynamic saturation circuit operably coupled to the adder; and accumulator register operably coupled to receive a value from the dynamic saturation circuit and to provide a stored value to the adder, wherein the dynamic saturation circuit includes:

saturation level setting circuit that establishes an intermediate saturation value; and saturation indicator operably coupled to the saturation level setting circuit, wherein the saturation indicator determines when a resultant from the adder compares unfavorably to the intermediate saturation value, and wherein, when the resultant from the adder compares unfavorably to the intermediate saturation value, provides a saturation default value to the accumulator register.

10. The multiply and accumulate circuit of claim 9 wherein the saturation level setting circuit includes a mask generator interoperably coupled to a saturation block to generate the intermediate saturation value.

11. The multiply and accumulate circuit of claim 9 wherein the saturation level setting circuit comprises additional circuitry for providing a final saturation value and wherein the saturation indicator includes circuitry for determining when the resultant from the adder compares unfavorably to the final saturation value, and wherein, when the resultant from the adder compares unfavorably to the final saturation value, the saturation indicator provides a final saturation default value to the accumulator register.

12. The multiply and accumulate circuit of claim 9 wherein the resultant of the adder compares unfavorably to the intermediate saturation value when the resultant of the adder exceeds the intermediate saturation value.

13. The multiply and accumulate circuit of claim 9 wherein the resultant of the adder compares unfavorably to the intermediate saturation value when the intermediate saturation value exceeds the resultant of the adder.

14. A method for providing a dynamic saturation value for a multiply and accumulate circuit, the method comprising the steps of:

(a) receiving a signal to produce a received signal, wherein the signal represents a desired saturation range;

(b) establishing a saturation value based on the received signal;

(c) receiving a result from a multiply/accumulate circuit;

(d) comparing the result with the saturation value; and (e) when the result compares unfavorably with the saturation value, producing a saturation default value.

15. The method of claim 14 further comprising the step of altering the saturation value upon receipt of a second signal.

16. The method of claim 14 further comprising the step of extracting a final result from the multiply/accumulate circuit based upon the saturation value.

* * * * *